(12) United States Patent
Wang et al.

(10) Patent No.: US 12,150,164 B2
(45) Date of Patent: *Nov. 19, 2024

(54) COMMUNICATION APPARATUS AND COMMUNICATION METHOD

(71) Applicant: Panasonic Intellectual Property Corporation of America, Torrance, CA (US)

(72) Inventors: Lilei Wang, Beijing (CN); Hidetoshi Suzuki, Kanagawa (JP)

(73) Assignee: Panasonic Intellectual Property Corporation of America, Torrance, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/350,568

(22) Filed: Jul. 11, 2023

(65) Prior Publication Data

US 2023/0362977 A1 Nov. 9, 2023

Related U.S. Application Data

(63) Continuation of application No. 17/692,037, filed on Mar. 10, 2022, now Pat. No. 11,743,935, which is a
(Continued)

(51) Int. Cl.
*H04W 72/566* (2023.01)
*H04W 72/02* (2009.01)
(Continued)

(52) U.S. Cl.
CPC ......... *H04W 72/566* (2023.01); *H04W 72/02* (2013.01); *H04W 72/0446* (2013.01);
(Continued)

(58) Field of Classification Search
CPC ............... H04W 72/566; H04W 72/02; H04W 72/0446; H04W 72/51; H04W 72/56;
(Continued)

(56) References Cited

U.S. PATENT DOCUMENTS

2014/0050187 A1 2/2014 Nakshima et al.
2014/0341145 A1 11/2014 Nakashima et al.
(Continued)

FOREIGN PATENT DOCUMENTS

| CN | 102340824 A | 2/2012 |
| WO | WO 2017028747 A1 | 2/2017 |
| WO | WO 2018030306 A1 | 2/2018 |

OTHER PUBLICATIONS

Communication pursuant to Article 94(3) EPC dated Sep. 15, 2021 for the related European Patent Application No. 17908490.0.
(Continued)

*Primary Examiner* — Michael K Phillips
(74) *Attorney, Agent, or Firm* — Seed IP Law Group LLP

(57) ABSTRACT

An integrated circuit includes control circuitry, which, in operation, controls: i) in a first case that a relation between a first resource pool in a first carrier and a priority of a packet satisfies a determined condition, selecting the first resource pool for transmission of the packet; and transmitting the packet using the first resource pool, and ii) in a second case that the relation between the first resource pool in the first carrier and the priority of the packet does not satisfy the determined condition, selecting a second resource pool out of a plurality of resource pools in a plurality of carriers, based on channel busy ratios (CBRs) of the plurality of resource pools, wherein the second resource pool is selected in increasing order of the CBRs from a lowest CBR of the CBRs; and transmitting the packet using the second resource pool.

5 Claims, 8 Drawing Sheets

Related U.S. Application Data continuation of application No. 16/603,572, filed as application No. PCT/CN2017/083121 on May 4, 2017, now Pat. No. 11,304,217.

(51) Int. Cl.

| | |
|---|---|
| *H04W 72/0446* | (2023.01) |
| *H04W 72/51* | (2023.01) |
| *H04W 72/56* | (2023.01) |
| *H04W 74/0808* | (2024.01) |
| *H04W 76/10* | (2018.01) |

(52) U.S. Cl.
CPC .......... *H04W 72/51* (2023.01); *H04W 72/56* (2023.01); *H04W 74/0808* (2013.01); *H04W 76/10* (2018.02)

(58) Field of Classification Search
CPC . H04W 74/0808; H04W 76/10; H04W 28/08; H04W 88/04; H04W 92/18
See application file for complete search history.

(56) References Cited

U.S. PATENT DOCUMENTS

| | | |
|---|---|---|
| 2017/0006622 A1 | 1/2017 | Baghel et al. |
| 2018/0146467 A1 | 5/2018 | Kim et al. |
| 2019/0045465 A1 | 2/2019 | Lee et al. |
| 2019/0116475 A1 | 4/2019 | Lee et al. |
| 2019/0174503 A1 | 6/2019 | Adachi et al. |
| 2019/0191461 A1 | 6/2019 | Lee et al. |
| 2019/0313279 A1 | 10/2019 | Li et al. |
| 2019/0356451 A1 | 11/2019 | Zhang et al. |
| 2019/0387377 A1 | 12/2019 | Zhang et al. |
| 2020/0029245 A1 | 1/2020 | Khoryaev et al. |
| 2020/0068593 A1 | 2/2020 | Seo et al. |
| 2020/0107330 A1 | 4/2020 | Chae et al. |
| 2020/0120685 A1 | 4/2020 | Lee et al. |
| 2020/0128470 A1 | 4/2020 | Mok et al. |
| 2020/0383094 A1 | 12/2020 | Chae et al. |
| 2022/0086805 A1 | 3/2022 | Zhang et al. |
| 2023/0262662 A1* | 8/2023 | Li .................... H04B 17/318 370/330 |

OTHER PUBLICATIONS

Ericsson, R2-165517, Discussion on PC5 Multiple Carrier, 3GPP TSG RAN WG2 #95, 3GPP, Server release date, Aug. 12, 2016.

Indian Examination Report dated Feb. 8, 2022 for the related Indian Patent Application No. 201947042999.

Indian Office Action, issued Oct. 26, 2022, for Indian Patent Application No. 202248043856. (5 pages).

Intel Corporation, "On timing relationship between sensing window, packet arrival, resource reselection trigger, PSCCH and PSSCH transmissions", R1-166513, Agenda Item: 7.2.2.2.2, 3GPP TSG RAN WG1 Meeting #86, Gothenburg, Sweden, Aug. 22-26, 2016, 8 pages.

Intel Corporation, Details of congestion control for V2V communication [online], 3GPP TSG RAN WG1 #88 3GPP₋₁ ¼ Œ Feb. 17, 2017, R1-1702142.

Intel Corporation: "Design options to support priority for V2V communication", 3GPP Draft; R1-167693 Intel-V2V Priority, 3rd Generation Partnership Project (3GPP), Mobile Competence Centre; 650, Route Des Lucioles ;F-06921 Sophia-Antipolis Cedex; France, vol. RAN WG1, No. Gothenburg, Sweden; Aug. 22, 2016-Aug. 26, 2016, Aug. 21, 2016, XP051126031.

Intel Corporation: "Details of resource pool design for sidelink V2V communication", 3GPP Draft; R1-166515 Intel-V2V Pool, 3rd Generation Partnership Project (3GPP), Mobile Competence Centre; 650, Route Des Lucioles; F-06921 Sophia-Antipolis Cedex; France, vol. Ran WG1, No. Gothenburg, Sweden; Aug. 22, 2016-Aug. 26, 2016 Aug. 13, 2016, XP051132806.

Intel Corporation: "Discussion on resource selection aspects to support V2V communication with different transmission periodicity", 3GPP Draft; R1-167694 Intel-V2V Period, 3rd Generation Partnership Project (3GPP), Mobile Competence Centre; 650, Route Des Lucioles; F-06921 Sophia-Antipolis Cedex; France, vol. RAN WG1, No. Gothenburg, Sweden; Aug. 22, 2019-Aug. 26, 2016 Aug. 21, 2016, XP051126032.

International Search Report of PCT application No. PCT/CN2017/083121 dated Jan. 29, 2018.

NEC, "Load balancing across multiple carriers," R1-1701926, Agenda Item: 7.2.1.3, 3GPP TSG RAN WG1 Meeting #88, Athens, Greece, Feb. 13-17, 2017, 2 pages.

NEC: "Discussions on congestion control in distributed scheduling mode", 3GPP Draft; R1-1609141, 3rd Generation Partnership Project (3GPP), Mobile Competence Centre; 650, Route Des Lucioles; F-06921 Sophia- Antipolis Cedex; France, vol. RAN WG1, No. Lisbon, Portugal; Oct. 10, 2016-Oct. 14, 2016 Sep. 30, 2016 (Sep. 30, 2016), XP051158444.

Panasonic, Discussion on CBR measurement and congestion control behavior[online], 3GPP TSG RAN WG1 #88₁ ¼ Œ 3GPP, Feb. 17, 2017, R1-1701931.

Panasonic, R1-166969, Discussion on channel busy ratio measurement in V2V, 3GPP TSG RAN WG1 #86(Aug. 12, 2016. 3GPP Server release).

Samsung, "Discussion on congestion control", R1-1608990, Agenda Item: 7.2.1.5.1, 3GPP TSG RAN WG1 Meeting #86bis, Lisbon, Portugal, Oct. 10-14, 2016, 6 pages.

The Extended European Search Report dated Mar. 20, 2020 for the related European Patent Application No. 17908490.0, 13 pages.

ZTE, ZTE Microelectronics, "Considering CA on PC5 carrier," R1-1704652, Agenda Item: 7.2.3.1.1, 3GPP TSG RAN WG1 Meeting #88bis, Spokane, Washington, USA, Apr. 3-7, 2017, 3 pages.

\* cited by examiner

COMMUNICATION APPARATUS AND COMMUNICATION METHOD

CROSS-REFERENCE TO RELATED APPLICATION(S)

This application is a continuation of U.S. application Ser. No. 17/692,037 filed Mar. 10, 2022, which is a continuation of U.S. application Ser. No. 16/603,572 filed Oct. 7, 2019, which is a U.S. national entry application of PCT/CN2017/083121 filed May 4, 2017, which is incorporated herein by reference.

BACKGROUND

1. Technical Field

The present disclosure relates to wireless communication field, and more particular, to a user equipment and a method for selecting at least one resource across multiple carries for transmitting at least one packet in sidelink.

2. Description of the Related Art

A PC5 operation across multiple carriers is an object in e V2X (enhanced V2X) work item. However, for a mode 4 operation in which a user equipment operates in an autonomous scheduling scheme, it is unclear how to do sensing, carrier/resource selection, power control, and collision handling between transmission and reception in case of multiple carriers.

SUMMARY

In one general aspect, it is to provide a user equipment (UE) that selects at least one resource across a plurality of carries for transmitting at least one packet in sidelink, comprising: a sensor, operative to sense a plurality of resource pools of the plurality of carriers within a sensing window to obtain a sensing result, wherein the length of the sensing window is configurable or preconfigured; a resource selector, operative to obtain a plurality of available resources of the plurality of carriers within a resource selection window according to the sensing result, wherein the plurality of available resources are included in at least one resource pool of the plurality of carriers within the resource selection window, the resource selector is operative to select at least one resource from the plurality of available resources of the plurality of carriers within the resource selection window in accordance with at least one of a priority of the at least one resource pool and a priority of the at least one packet, and wherein the length of the resource selection window is determined according to a desired latency; and a transmitter, operative to transmit the at least one packet on the at least one resource which is selected by the resource selector.

In another general aspect, it is to provide a method for selecting at least one resource across a plurality of carries for transmitting at least one packet in sidelink by a user equipment (UE), comprising: sensing a plurality of resource pools of the plurality of carriers within a sensing window to obtain a sensing result, wherein the length of the sensing window is configurable or preconfigured; obtaining a plurality of available resources of the plurality of carriers within a resource selection window according to the sensing result, wherein the plurality of available resources are included in at least one resource pool of the plurality of carriers within the resource selection window, wherein the length of the resource selection window is determined according to a desired latency; selecting at least one resource from the plurality of available resources of the plurality of carriers within the resource selection window in accordance with at least one of a priority of the at least one available resource pool and a priority of the at least one packet; and transmitting the at least one packet on the at least one resource which is selected.

It should be noted that general or specific embodiments may be implemented as a system, a method, an integrated circuit, a computer program, a storage medium, or any selective combination thereof.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

DETAILED DESCRIPTION

Embodiments will now be described with reference to the drawings, which relate to a communication method, apparatus and system. It is understood that the present disclosure may be embodied in many different forms and in many different orders and should not be construed as being limited to the embodiments set forth herein. Rather, these embodiments are provided so that this disclosure will be thorough and complete and will fully convey the present disclosure to those skilled in the art. Indeed, the present disclosure is intended to cover alternatives, modifications and equivalents of these embodiments, which are included within the scope and spirit of the technology as defined by the appended claims. Furthermore, in the following detailed description of the present disclosure, numerous specific details are set forth in order to provide a thorough understanding of the present disclosure. However, it will be clear to those of ordinary skill in the art that the present disclosure may be practiced without such specific details.

While orders of the steps of the methods and the structures of the components are provided herein for exemplary purposes, but not for limitation. The following detailed description of the technology will be presented for purposes of illustration and description. It is not intended to be exhaustive or to limit the technology to the precise form disclosed. Many modifications and variations are possible in light of the above teaching. The described embodiments were chosen in order to best explain the principles of the technology and its practical application to thereby enable others skilled in the art to best utilize the technology in various embodiments and with various modifications as are suited to the particular use contemplated. It is intended that the scope of the technology be defined by the claims appended hereto.

Figure 1:
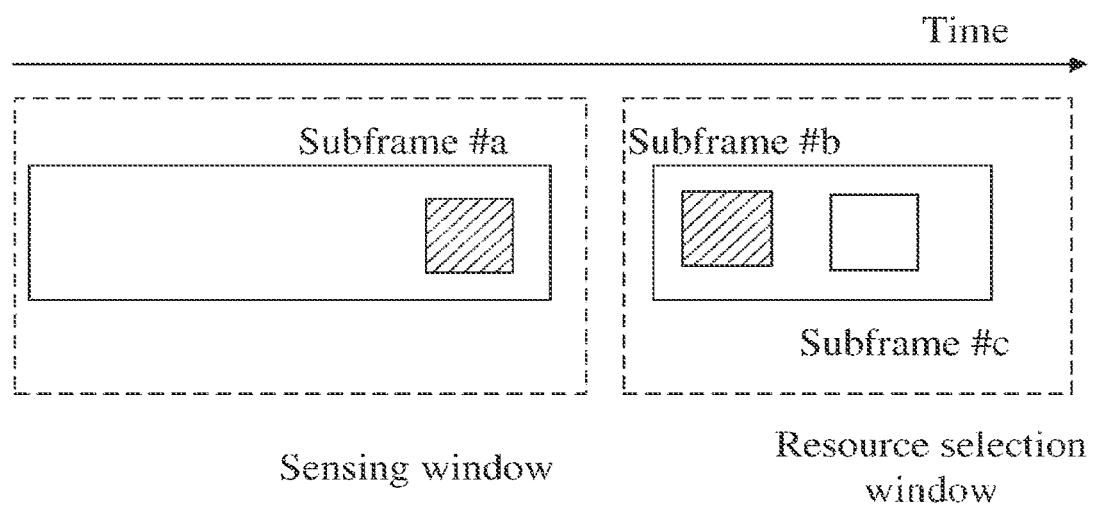
FIG. 1 schematically shows an example of sensing resources of one carrier within a sensing window in a prior art.

According to Rel.14 specification, for subframes that a user equipment can not monitor due to transmission and so on within a sensing window, relevant resources may not be selected within a resource selection window. FIG. 1 shows an example of sensing resources of one carrier within the sensing window in a prior art. As shown in FIG. 1, one carrier is sensed in a sensing window, and the carrier in the sensing window may include multiple resources. In a subframe #a, a resource is used for transmission. A user equipment does not monitor the resource in the subframe #a as the resource is used for transmission. Thus, the resource can not be selected in the resource selection window in a subframe #b assuming a certain periodicity is present. If there is no any collision, the resource in a subframe #c can be selected.

However, in case of multiple carriers, it is unclear how to obtain available resources in the resource selection window for selection. Moreover, due to RF component limitation or requirement, the user equipment may have different capabilities on whether the user equipment can transmit and receive a packet in sidelink simultaneously. For example, when the carriers are quite close like intra-band multiple carriers, the user equipment is not able to transmit and receive simultaneously, while when the carriers are sufficiently far from each other like inter-band multiple carriers, the user equipment can transmit and receive simultaneously. However, the current sensing mechanism is not satisfied in case of multiple carriers for the user equipment with different capabilities.

With regard to power allocation and maximum power limitation, the Rel.14 specification only defines the maximum power limitation for a single carrier. However, in case of multiple carriers, the maximum power limitation is unclear for each of the carriers. Moreover, for power allocation across the multiple carriers, it is necessary to employ an efficient way to allocate powers among multiple carriers to guarantee the QoS.

Moreover, in order to satisfy requirements of latency and guarantee the Qos, it is necessary to select resources, especially of the multiple carriers, in the resource selection window in an efficient way.

Figure 2:
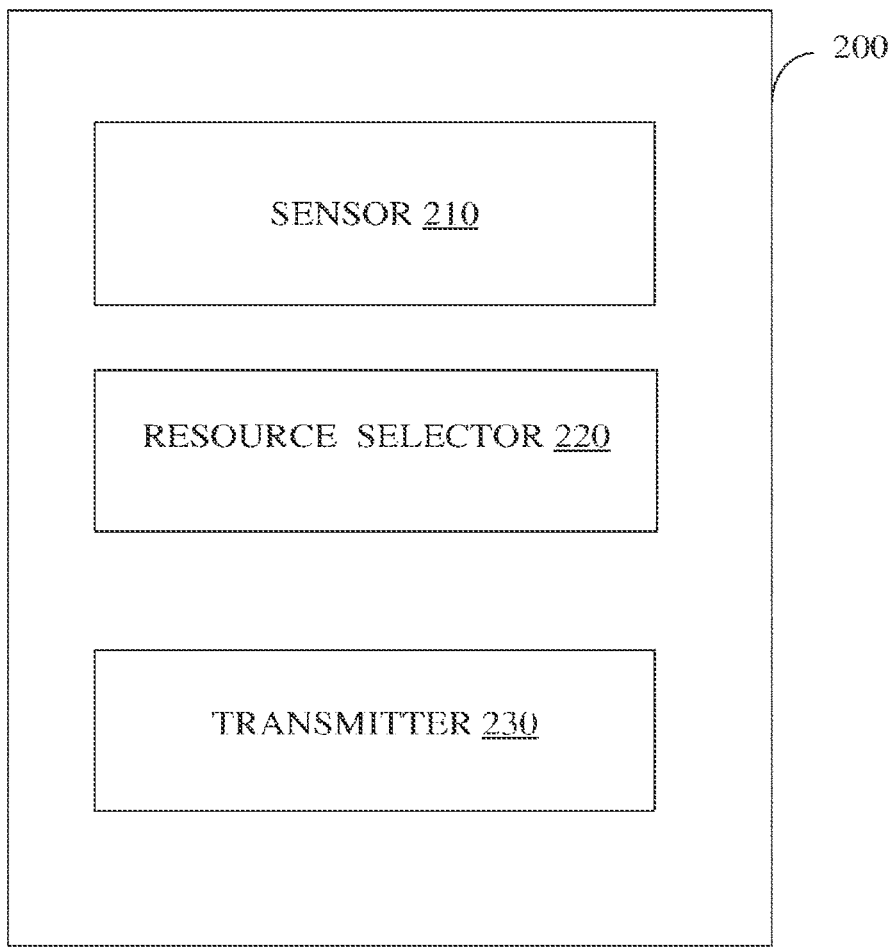
FIG. 2 schematically shows an example of block diagram of a user equipment according to an embodiment of the present disclosure.

FIG. 2 schematically shows an example of block diagram of a user equipment 200 according to an embodiment of the present disclosure.

In the embodiment, the user equipment operates in a UE autonomous scheduling scheme (mode 4 operation) in e V2X across the multiple carriers. Each carrier may include at least one resource pool, and each resource pool includes multiple resources for transmitting packets for the user equipment.

As shown in FIG. 2, the user equipment 200 includes a sensor 210, a resource selector 220, and a transmitter 230. In one embodiment, the sensor 210 may sense a plurality of resource pools of the plurality of carriers within a sensing window to obtain a sensing result, wherein the length of the sensing window is configurable or preconfigured. In one embodiment, the resource selector 220 may obtain a plurality of available resources of the plurality of carriers within a resource selection window according to the sensing result, wherein the plurality of available resources are included in at least one resource pool of the plurality of carriers within the resource selection window, the resource selector is operative to select at least one resource from the plurality of available resources of the plurality of carriers within the resource selection window in accordance with at least one of a priority of the at least one resource pool and a priority of the at least one packet, and wherein the length of the resource selection window is determined according to a desired latency. And the transmitter 230 may transmit the at least one packet on the at least one resource which is selected by the resource selector 210, in one embodiment.

In one embodiment, the sensor 210 may sense a plurality of resource pools of the plurality of carriers within a sensing window to obtain a sensing result, wherein the length of the sensing window is configurable or preconfigured. The sensing result may indicate situation of the resources of the carriers. The sensing result may include S-RSRP (sidelink-Reference Signal Received Power) and S-RSSI (sidelink-Received Signal Strength Indicator) of the resources for further resource selection used by the resource selector 220.

The resource selector 220 may obtain a plurality of available resources of the plurality of carriers within a resource selection window according to the sensing result, wherein the plurality of available resources are included in at least one resource pool of the plurality of carriers within the resource selection window. The resource selector 220 selects the available resources based on the sensing result. The resource selector 220 precludes the resources within the resource selection widow with a relatively high S-RSRP.

Figure 3:
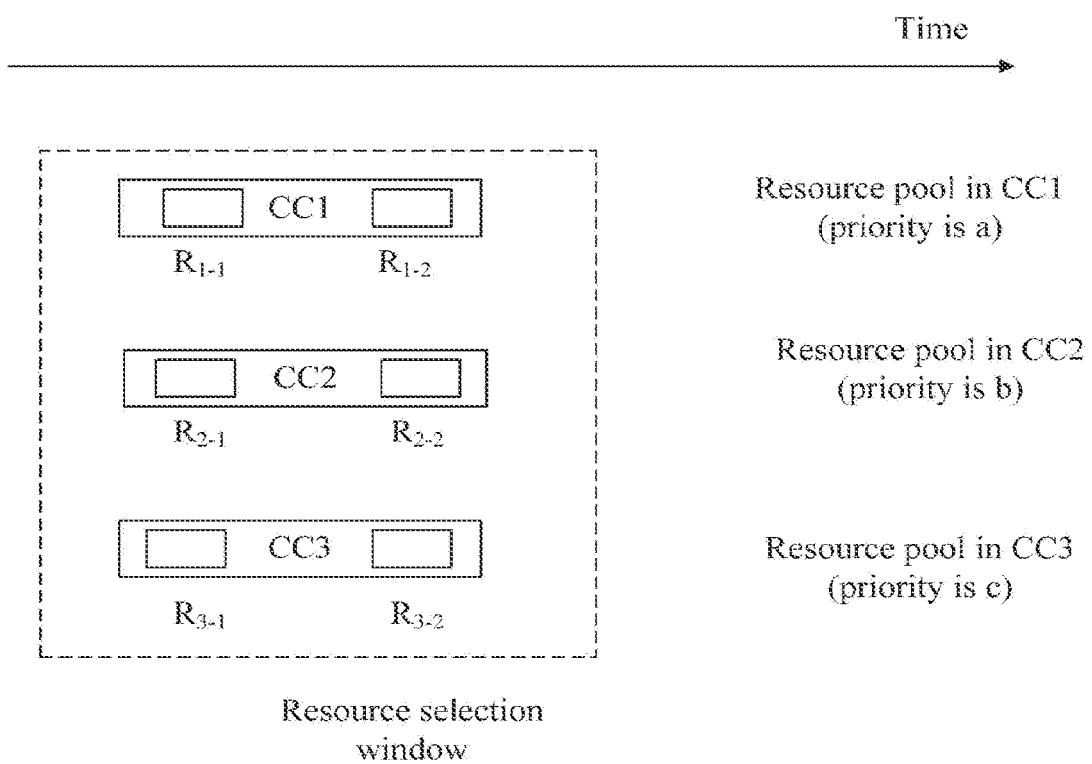
FIG. 3 schematically shows an example of available resources in multiple resource pools of multiple carries within a resource selection window according to an embodiment of the present disclosure.

FIG. 3 schematically shows an example of available resources in multiple resource pools of multiple carries within a resource selection window according to an embodiment of the present disclosure. As shown in FIG. 3, a sensing result is obtained for each carrier CCi (1≤i≤3, as shown in FIG. 3). For the purpose of brevity, each carrier CCi shown in FIG. 3 includes one resource pool, and three carriers are shown herein. However, it should be understood that any number of resource pools may be included in each carrier according to application requirements. As shown in FIG. 3, for example, available resources $R_{1-1}$ and $R_{1-2}$ are obtained for carrier CC1 after sensing by the resource selector 220, available resources $R_{2-1}$ and $R_{2-2}$ are obtained for carrier CC2 after sensing by the resource selector 220, and available resources $R_{3-1}$ and $R_{3-2}$ are obtained for carrier CC3 after sensing by the resource selector 220. All the available resources are within the resource selection window for further selection by the resource selector 220, which will be described in detail below.

In one embodiment, the resource selector 220 may determine a non-monitored resource within the sensing window based on whether the user equipment can receive and transmit a packet in sidelink simultaneously.

More specifically, when the user equipment 200 receives and transmits a packet in sidelink simultaneously, e.g., in case of inter-band multiple carriers, e.g., with one band is approximately to 2 GHz and another band is approximately to 5 GHz, the resource selector 220 may determine a non-monitored resource within the sensing window independently. And if the user equipment can not receive and transmit in sidelink simultaneously, e.g., in case of intra-band multiple carriers, the resource selector 220 determines a non-monitored resource within the sensing window in connection with transmission situations of the other carriers. A first resource in a subframe in a first carrier within the sensing window is determined as a non-monitored resource if a second resource in a second carrier in the same subframe within the sensing window is used for transmission.

Figure 4:
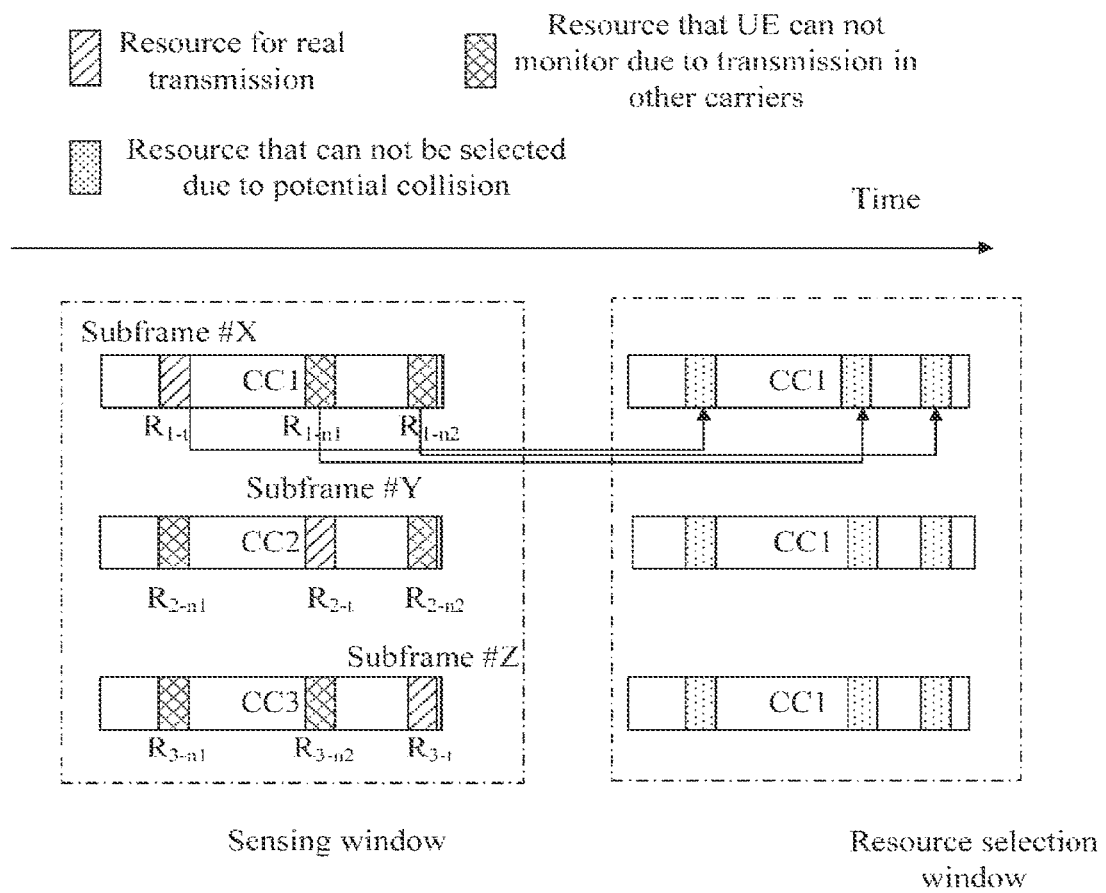
FIG. 4 schematically shows an example of determining multiple non-monitored resources of multiple carries within a sensing window according to an embodiment of the present disclosure.

FIG. 4 schematically shows an example of determining multiple non-monitored resources of multiple carries within a sensing window according to an embodiment of the present disclosure. FIG. 4 shows an example of determining multiple non-monitored resources within a sensing window when the user equipment can not receive and transmit a packet in sidelink simultaneously. As shown in FIG. 4, three carriers CC1-CC3 are in the sensing window, and each carrier includes one resource pool for the purpose of brevity. In a subframe #X of the sensing window, a resource $R_{1-t}$ in carrier CC1 is used for transmission. Therefore, the resource $R_{2-n1}$ in the same subframe #X in the second carrier CC2 is determined by the resource selector 220 to be non-monitored, and the resource $R_{3-n1}$ in the same subframe #X in the third carrier CC3 is determined by the resource selector 220 to be non-monitored as well. Similarly, the resources $R_{1-n}$ and $R_{3-n2}$ in a subframe #Y are determined to be non-monitored as the resource $R_{2-t}$ is used for transmission in the subframe #Y, and the resources $R_{1-n2}$ and $R_{2-n2}$ in a subframe #Z are determined to be non-monitored as the resource $R_{3-t}$ is used for transmission in the subframe #Z. Therefore, the resources (shown as blocks with dots in the resource selection window in FIG. 4) corresponding to the non-monitored resources are not able to be selected within the resource selection window.

Advantageously, when the user equipment is not able to transmit and receive a packet in sidelink simultaneously, determining non-monitored each of the carriers in connection with transmission situation of the other carriers in the sensing window can optimize the selection mechanism based on user equipment's capability in different frequencies. Although only one resource in a subframe is shown for transmission in FIG. 4, it should be understood that, it is only for the purpose of illustration, but not a limitation, any number of resources in different subframes in any carrier within the sensing window may be used for transmission, and the non-monitored resources in other carrier may be determined accordingly.

The resource selector 220 in the user equipment 200 may select at least one resource from the multiple available resources of the multiple carriers within the resource selection window in accordance with at least one of a priority of the at least one resource pool and a priority of the at least one packet.

More specifically, the resource selector 220 can select a resource pool according to relationship between priorities of multiple resource pools of carriers within the resource selection window and the priority of the at least one packet, and select a resource pool whose priority is not higher than the priority of the at least one packet as at least one selected resource pool, and select at least one resource from the at least one selected resource pool to transmit the at least one packet. In one embodiment, the priority of the at least one packet is indicated by a priority of a logical channel of the at least one packet or a priority of a higher layer of the at least one packet.

Referring back to FIG. 3, which schematically shows an example of available resources of multiple resource pools in multiple carries within a resource selection window according to an embodiment of the present disclosure, each carrier includes one resource pool, and each resource pool has a corresponding priority. Specifically, the resource pool RP1 in carrier CC1 has a priority of a, the resource pool RP2 in carrier CC2 has a priority of b, the resource pool RP3 in carrier CC3 has a priority of c, and the priority of RP1 is higher than the priority of RP2, which is higher than RP3, e.g., a=1, b=2, c=3. Assuming a packet to be transmitted has a priority d. If the priority d=3, which means the priority d of the packet to be transmitted has the lowest priority, but equals to the priority of RP3, then the resource selector 220 only selects resource pool RP3 in carrier CC3 as the selected resource pool. If the priority d=2, which means the priority b of RP2 and the priority c of RP3 are not higher than priority d, then the resource selector 220 selects resource pool RP2 in carrier CC2 and the resource pool RP3 in carrier CC3 as the selected resource pools. If the priority d=1, which is the highest priority, and means the priority a of RP1, priority b of RP2 and the priority c of RP3 are not higher than priority d, the resource selector 220 selects resource pool RP1 in carrier CC1, the resource pool RP2 in carrier CC2, and the resource pool RP3 in carrier CC3 as the selected resource pools, and among the selected resource pools, the resource pool RP1 in the carrier CC1 may be selected to transmit the packet first, as the RP1 has the highest priority.

The available resources shown in FIG. 3 are only for the purpose of illustration. And it should be understood that any number of available resources in any subframe of the carriers in the resource selection window can be applied in accordance with applicable requirement.

After the resource pools have been selected, the resource selector 220 may select the at least one resource from the selected resource pools for transmitting the at least one packet.

In one embodiment, the priority of the packet to be transmitted is indicated by a priority of a logical channel of the packet. If the MAC PDU includes multiple logic channels, a priority of a logic channel may be selected as the priority of the MAC PDU, e.g., the highest priority among the logic channels, the lowest priority among the logic channels can be selected as the priority of the MAC PDU, which further indicates the priority of the packet. It should be understood that, there are other ways to select the priority among the priorities of the logic channels, for example, the average of priorities of the logic channels may be selected as the priority of the MAC PDU. In another embodiment, the priority of the higher layer of the packet may indicate the priority of the packet. The higher layer may be an application layer higher than layer 3 (RRC) of the packet.

Advantageously, by selecting the at least one selected resource pool in accordance with the relationship between the priorities of the resource pools and the priority of the at least one packet, QoS, such as latency, reliability and the like of the communication is guaranteed.

In one embodiment, according to the priorities of the resource pools, if the resource pools in different carriers within the resource selection window have the same priority, the resource selector 220 may select at least one resource for transmitting the at least one packet from the resource pools of the carriers in the resource selection window in accordance with a time sequence of the available resources in the resource pools. A resource that has the least time delay with a previously selected resource is selected as the resource to transmit the at least one packet.

Figure 5:
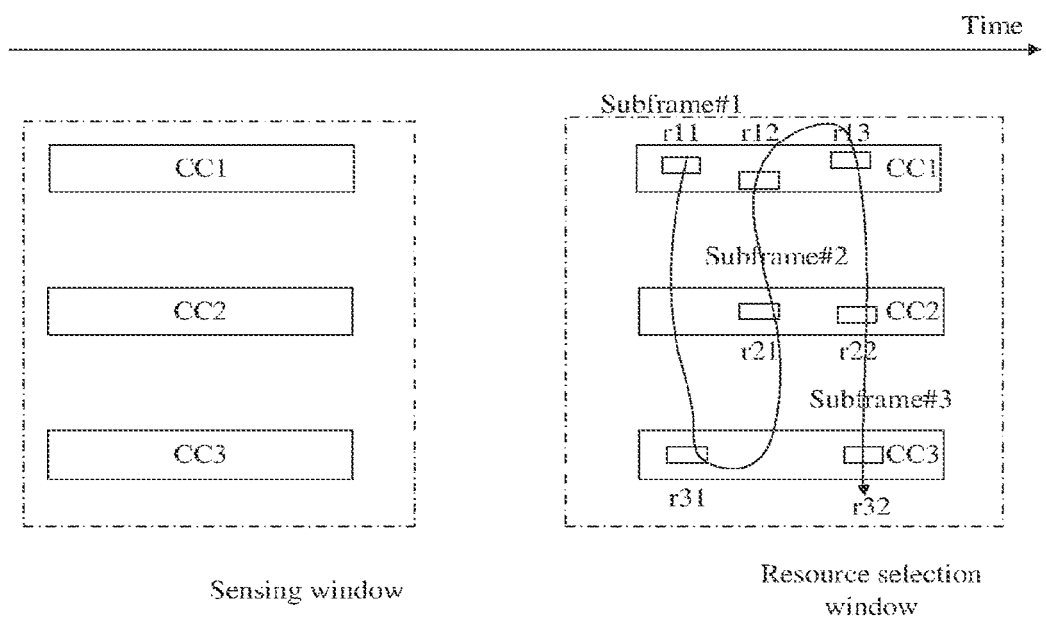
FIG. 5 schematically shows an example of selecting multiple resources from multiple resource pools of multiple carriers within a resource selection window according to an embodiment of the present disclosure.

FIG. 5 schematically shows an example of selecting multiple resources from multiple resource pools of multiple carriers within a resource selection window according to an embodiment of the present disclosure. As shown in FIG. 5, each resource pool in each carrier within the resource selection window has the same priority. For the purpose of brevity, each carrier in FIG. 5 includes one resource pool. It should be understood that each carrier may include multiple resource pools. After sensing the resource pools of the carriers within the sensing window, available resources are obtained for the carriers within the resource selection window. As shown in FIG. 5, available resources r11, r12, and r13 are obtained for a carrier CC1, available resources r21 and r22 are obtained for a carrier CC2, and available resources r31 and r32 are obtained for a carrier CC3. When performing selection, the resource selector 220 first selects the resource r11 as a start resource, then the resource r31 which has the least time delay with resource r11 is selected next, then resource r21 is selected, and then r12, r13, r22, and r32 are selected sequentially according to a time delay with the previously selected resource.

Although the resources r11 and r31 are shown in the same subframe, r12 and r21 are shown in the same subframe, and the resources r13, r22, and r32 are in the same subframe, it should be understood that the resources arrangement shown in FIG. 5 is only for illustrative purpose and other arrangement of the resources are available herein.

By selecting the resources based on the time sequence of the available resources, the latency can be guaranteed.

In another embodiment, according to the priorities of the resource pools, if the resource pools in different carriers have the same priority, the resource selector 220 may select the at least one resource from the resource pools in accordance with at least one of channel busy ration (CBR) and channel occupancy radio (CR) of each of the resource pools.

In one embodiment, the CBR of each of the resource pools may be a CBR measurement result obtained by using CBR measurement, and indicates situation of each of the resource pools. The window size for CBR measurement may be different with that for sensing in resource selection procedure. For example, the window size for sensing is 1 second while the window size for CBR measurement may be only 100 ms. CR may be directly obtained by CR measurement implemented by the resource selector 220 as CR is the statistics of the resource pool's own transmission.

Figure 6:
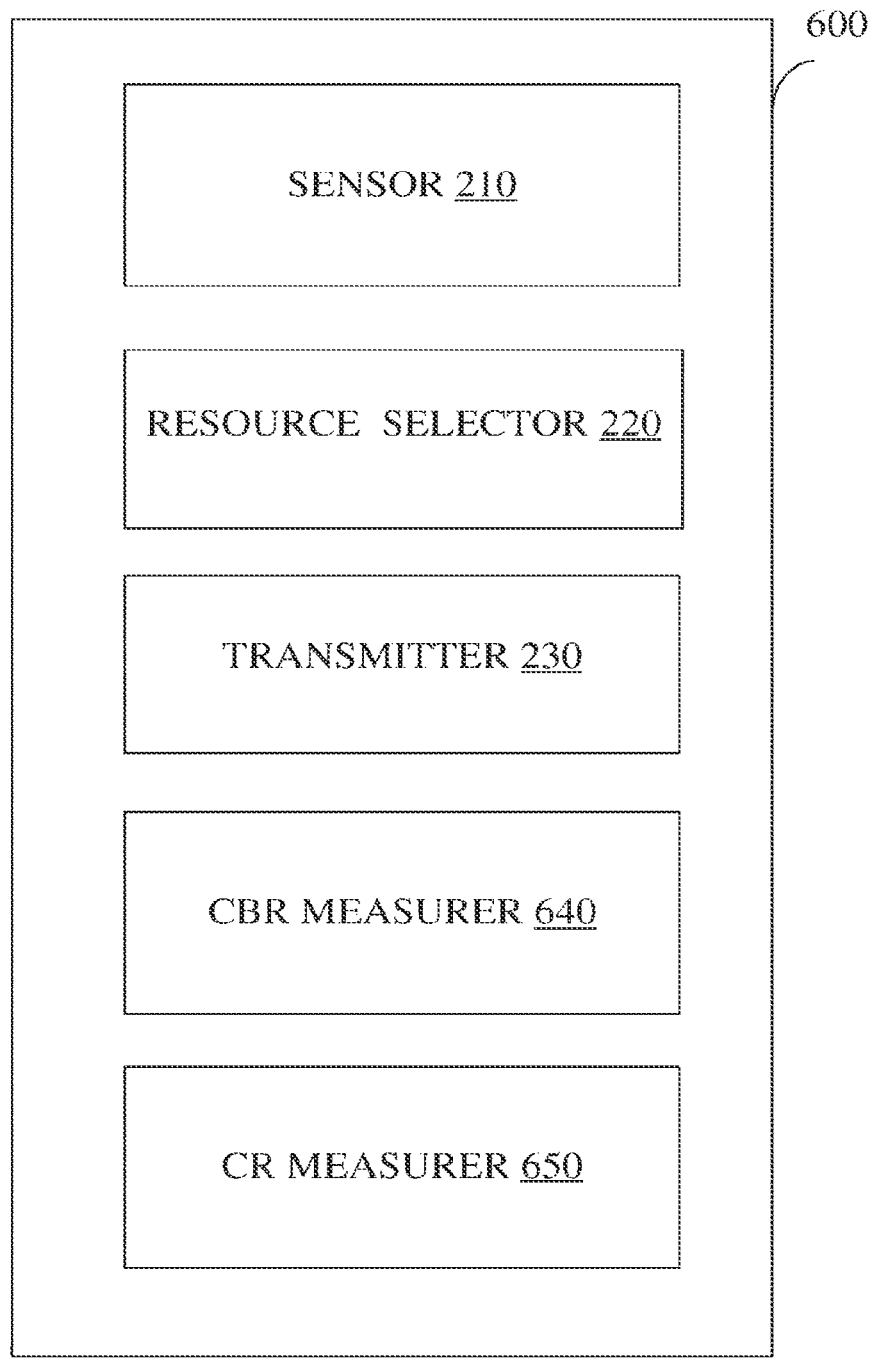
FIG. 6 schematically shows an example of block diagram of a user equipment according to an embodiment of the present disclosure.

In another example, the sensing, the CBR measurement, and the CR measurement are implemented by using different entities and may be implemented separately. FIG. 6 schematically shows an example of block diagram of a user equipment 600 according to an embodiment of the present disclosure. The user equipment 600 includes elements to implement the sensing, the CBR measurement, and the CR measurement, respectively. Elements having similar functions as FIG. 2 are labeled in the same way and will not be repetitively described for the purpose of brevity and clarity.

For example, the sensing is implemented by the sensor 210 for obtaining a sensing result indicating situation of the resources, such as S-RSRP and S-RSSI. The CBR measurement is implemented by a CBR measurer 640 for obtaining a CBR for each resource pool. The CR measurement is implemented by a CR measurer 650 obtaining a CR for each resource pool. The sensing, the CBR measurement, and the CR measurement are implemented by the sensor 210, the CBR measurer 640, and the CR measurer 650, respectively, and the implementation of the sensing, the CBR measurement, and the CR measurement are separated from each other.

Each resource pool has a CBR indicating the busy ratio of the resource pool. The resource selector 220 may select the resource pool with the lowest CBR to transmit the at least one packet in one embodiment. The resource selector 220 may rank the resource pools within the resource selection window according to CBR, and select the resources of the multiple resource pools according to an ascending order of the CBRs to transmit multiple packets. In one embodiment, when a resource pool is selected, further rule may be used for selecting resources for the selected resource pool. According to the further rule, the resources can be selected based on the S-RSSI of the resources, time sequence of the resources as described above, etc., or the combination thereof.

Figure 7:
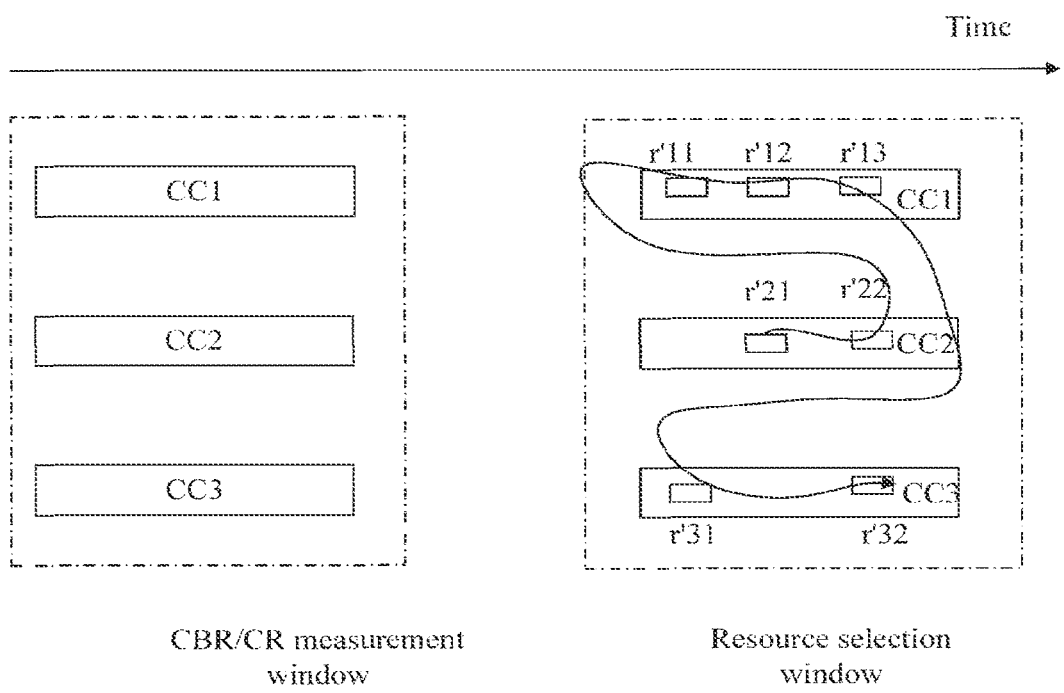
FIG. 7 schematically shows an example of selecting multiple resources from multiple resource pools of multiple carriers within a resource selection window according to another embodiment of the present disclosure.

FIG. 7 schematically shows an example of selecting multiple resources from multiple resource pools of multiple carriers within a resource selection window according to another embodiment of the present disclosure. As shown in FIG. 6, each resource pool in each carrier has the same priority. After sensing the resource pools of the carriers within the sensing window, available resources are obtained for the carriers within the resource selection window. As shown in FIG. 6, available resources r'11, r'12, and r'13 are obtained for carrier CC1, available resources r'21 and r'22 are obtained for carrier CC2, and available resources r'31 and r'32 are obtained for carrier CC3. Each resource pool within the resource selection window has a CBR. For example, the CBR for the resource pool of carrier CC1 is CBR1, the CBR for the resource pool of carrier CC2 is CBR2, and the CBR for the resource pool of carrier CC3 is CBR3. In one embodiment, it is provided that CBR2<CBR1<CBR3. Then the resource selector 220 selects the resources of the carrier CC2 first, as the resource pool of carrier CC2 has the lowest CBR, then the resources of the carrier CC1 are selected, and the resources of the carrier CC3 are selected, as shown in FIG. 7.

In one embodiment, each resource pool has a CR indicating the occupancy situation of the resource pool. The resource selector 220 may select the resource pool with the lowest CR to transmit the at least one packet in one embodiment. The resource selector 220 may rank the resource pools of the multiple carriers within the resource selection window according to CR, and select the resources of the multiple resource pools according to an ascending order of the CRs to transmit multiple packets. In one embodiment, when a resource pool is selected, a further rule may be used for selecting resources for the selected resource pool. According to the further rule, the resources can be selected based on the S-RSSI of the resources, time sequence of the resources as described above, etc., or the combination thereof.

Referring to FIG. 7, assuming each resource pool within the resource selection window has a CR. For example, assuming the CR for the resource pool of the carrier CC1 is CR1, the CR for the resource pool of carrier CC2 is CR2, and the CR for the resource pool of the carrier CC3 is CR3, and CR2<CR1<CR3, then the resource selector 220 selects the resources of the carrier CC2 first, as the resource pool of the carrier CC2 has the lowest CR, then the resources of the carrier CC1 are selected, and the resources of the carrier CC3 are selected, as shown in FIG. 7.

Advantageously, by selecting resources in accordance with CBR/CR of the resource pool, better congestion control is achieved.

Although as describe above, the resource selector 220 selects resources based on time sequence of resources and CBR/CR of resource pools, respectively, it should be understood that, the resource selector 220 may select resources based on any combination thereof.

Although in above embodiments, the rules based on time sequence of resources and CBR/CR of resource pools are used for resource pools with the same priority, such rules may also be used for resources pools with different priorities in other embodiments. The merit of latency or congestion control can be obtained in principle regardless of priority of resource pool.

More specifically, in one embodiment, for the resource pools of the carriers in the resource selection window with different priorities, the resource selector 220 may select at least one resource in accordance with time sequence of the available resources of the carriers. A resource that has the least time delay with a previously selected resource is selected as the resource to transmit the at least one packet.

The resource selector 220 first selects a start resource among the available resources, e.g., the resource in the earliest subframe within the resource selection window is selected as the start resource. Then a resource that has the least time delay with the start resource is selected. A next resource that has the least time delay with a previously selected resource is selected as the resource to transmit the at least one packet, and so on.

By selecting the resources based on the time sequence of the available resources, the latency can be guaranteed.

In another embodiment, if the resource pools in different carriers within the resource selection window have different priorities, the resource selector 220 may select the at least one resource from the resource pools in accordance with at least one of channel busy ration (CBR) and channel occupancy radio (CR) of each of the resource pools.

Each resource pool has a CBR indicating the busy ratio of the resource pool. The resource selector 220 may select the resource pool with the lowest CBR to transmit the packet in one embodiment. The resource selector 220 may rank the resource pools of the multiple carries according to CBR, and select the resources of the multiple resource pools according to an ascending order of the CBRs to transmit multiple packets.

In another embodiment, each resource pool has a CR indicating the occupancy situation of the resource pool. The resource selector 220 may select the resource pool with the lowest CR to transmit the at least one packet in one embodiment. The resource selector 220 may rank the resource pools of the multiple carriers according to CR, and select the resource pools of the multiple resource pools according to an ascending order of the CRs to transmit multiple packets.

Advantageously, by selecting resources in accordance with CBR/CR of the resource pool, better congestion control is achieved.

Although as describe above, the resource selector 220 selects resources based on time sequence of resources and CBR/CR of resource pools, respectively, it should be understood that, the resource selector 220 may select resources based on any combination thereof.

Furthermore, in Rel.14 specification, there are two steps during resource selection procedure based on sensing. One of the steps (hereinafter referred to as Step 2) precludes resources based on a sensing result indicating situation of the resources, for example, S-RSRP (sidelink-Reference Signal Received Power) of the resources. The other step (hereinafter referred to as Step 3) selects resources based on another sensing result indicating situation of the resources, e.g., S-RSSI (sidelink-Received Signal Strength Indicator) of the resources.

Step 2 and Step 3 may be improved for the user equipment communicating across multiple carriers, according to embodiments of the present disclosure.

More specifically, according to one embodiment of the present disclosure, in case of multiple carriers, the resource selector 220 of the user equipment operates in an improved Step 2 per carrier independently, and precludes at least one resource according to a sensing result indicating situation of the resources, e.g., S-RSRP, in each carrier. The user equipment precludes at least one resource, e.g., based on S-RSRP, for each carrier independently. In one embodiment, the resource selector 220 precludes the at least one resource with a relatively high S-RSRP for each carrier and obtain available resources for further selection for each carrier.

In one embodiment, the resource selector 220 may further preclude the at least one resource in each carrier based on the user equipment's capability on whether the user equipment transmits and receive a packet in sidelink simultaneously. For example, when the user equipment is not able to transmit or receive a packet in sidelink simultaneously, the resource selector 220 may further preclude the at least one resource in each carrier in connection with transmission situation of the other carriers, e.g., a first resource in a subframe in a first carrier is precluded if a second resource in a second carrier in the same subframe is used for transmission.

After the resource selector 220 precludes the at least one resource in each carrier, the left resources in each carrier are available for further selection within the resource selection window.

The further selection within the resource selection window can be implemented based on the relationship between the priorities of the resource pools within the resource selection window and the priorities of the packets to be transmitted, the time sequence of the available resources within the resource selection window, the CBR/CR of the resource pools of the resource selection window, and the combination thereof. The detailed description of these selection procedures has been described above, and is omitted here for brevity.

In one embodiment, the resource selector 220 of the user equipment may operate in an improved Step 3 for further selection within the resource selection window for transmitting packets. In one embodiment, the resource selector 220 selects resources of the multiple carriers within the resource selection window according to a sensing result indicating situation of the resources, such as, S-RSSI. In case of multiple carriers, the resource selector 220 of the user equipment ranks all available resources of the multiple carriers within the resource selection window based on S-RSSI of the available resources, and selects multiple resources with lowest S-RSSI of the resources. For example, if a selected resource is in a first carrier CC1, then the user equipment may transmit at least one packet in the first carrier CC1. The resource selector 220 may rank all the available resources of the multiple carriers within the resource selection window according to S-RSSI of the available resources, and select the resources of the multiple carriers within the resource selection window according to an ascending order of the S-RSSI of the resources to transmit multiple packets.

Alternatively, the resource selector 220 of the user equipment in the improved Step 3 may also select resources of the multiple carriers within the resource selection window according to a CBR measurement result indicating situation of the resources, such as, CBR of the resource pools, or CR of the resource pools, or a combination thereof in connection with the further rule. For example, the resource selector 220 of the user equipment ranks all available resource pools of the multiple carriers within the resource selection window, select the resource pools within the resource selection window according to an ascending order of the CBR, CR, or a combination thereof, and further select the resources according to the further rule to transmit multiple packets. As disclosed above, according to the further rule, the resources can be selected based on the S-RSSI of the resources, time sequence of the resources, etc., or the combination thereof.

In one embodiment, the available resources that are used for selection in the improved Step 3 include the resources obtained by the resource selector 220 of the user equipment operating in the improved Step 2. The detailed description of obtaining the available resources has been described above, and is omitted here for brevity.

In one embodiment, the user equipment 200 further includes a reception/transmission determiner that determines reception or transmission for the user equipment if the user equipment is not able to receive and transmit simultaneously.

In case of multiple carriers, user equipment 200 may not be able to receive and transmit a packet in sidelink simultaneously. Therefore, the reception/transmission determiner determines whether current operation in a subframe is reception or transmission for the user equipment if the user equipment is not able to receive and transmit simultaneously. In one embodiment, a rule is preconfigured that the transmission has a higher priority than that of reception if the user equipment is not able to receive and transmit simultaneously. Then the reception/transmission determiner determines that the transmission has higher priority than that of reception if the user equipment is not able to receive and transmit simultaneously according to the preconfigured rule.

The reception/transmission determiner may determine the reception or the transmission in accordance with a priority of the at least one resource pool, or in accordance with the priority of the at least one resource pool in combination with the priority of the at least one packet to be transmitted.

More specifically, for the resource pools of the carriers in the resource selection window with different priorities, the reception and the transmission may be determined based on the priorities of the selected resource pools or in accordance with the priorities of the selected resource pools in combination with the priority of the at least one packet. For example, in one embodiment, a transmission is determined to have a higher priority than that of reception for the user equipment if the selected resource pool has the highest priority. That is, the transmission is determined for the user equipment under a current operation. In another embodiment, the reception/transmission determiner may determine the reception or the transmission in accordance with the priorities of the selected resource pools in combination with the priority of the at least one packet. For example, if a priority of a selected resource pool is lower the priority of a packet to be transmitted, a transmission is determined to have a higher priority than that of reception for the user equipment; otherwise, reception is determined to have a higher priority than that of transmission for the user equipment.

For the resource pools of the carriers in the resource selection window have the same priority, the reception or the transmission may be determined based on the priorities of the resource pools of the carriers in the resource selection window or in accordance with priorities of the selected resource pools in combination with the priority of the at least one packet. For example, if the resource pools have a relatively high priority, transmission is determined to have a higher priority than that of reception for the user equipment. That is, the transmission is determined for the user equipment if the resource pools have a relatively high priority. Or if the priority of the resource pool is lower the priority of a packet to be transmitted, a transmission is determined to have a higher priority than that of reception for the user equipment; otherwise, a reception is determined to have a higher priority than that of the transmission for the user equipment.

By determining reception or transmission for the user equipment 200, the collision handling is solved in case of multiple carriers when the user equipment is not able to transmit and receive a packet in sidelink simultaneously.

In one embodiment, the user equipment 200 may further include a power allocator that allocates power to the at least one resource pool in accordance with at least one of a priority of the at least one resource pool and the priority of the at least one packet. According to the priorities of the resource pools of the carriers within the resource selection window, the power allocator may allocate power to the resource pools when the resource pools of the carriers in the resource selection window have the same priority, or the power allocator allocates power to the selected recourse pools when the resource pools in different carriers within the resource selection window have different priorities.

According to the priorities of the resource pools, if the resource pools of the carriers in the resource selection window have the same priority, power allocator allocates the power to the carriers of the resource pools evenly.

Power allocator allocates the power to the carries in which the selected resource pools are included when the resource pools of the carriers in the resource selection window have different priorities. In one embodiment, the power allocator allocates power to the selected resource pools with the highest priority. In another embodiment, the power allocator allocates power to the selected resource pools that will transmit the packet with the highest priority.

In one embodiment, the user equipment 200 further includes a power limitation determiner, that determines power limitation for the at least one resource pool based on CBR and a priority of the at least one resource pool.

For the resource pools of the carriers in the resource selection window with the same priority, the power limitation determiner limits maximum power to the resource pools of the carriers within the resource selection window. For the resource pools of the carriers in the resource selection window with different priorities, the power limitation determiner limits maximum power to the selected resource pools of the carriers within the resource selection window. The power limitation determiner determines power limitation for the resource pools or the selected resource pools within the resource selection window based on CBR and a priority of the at least one resource pool.

More specifically, for a specific CBR of a resource pool, there is mapping between the specific CBR and the priority of the packet with respect to the power limitation for each resource pool. The specific CBR may be an average CBR of the resource pools, or the minimum CBR of the resource pools. Based on the specific CBR and the priority of the packet, a maximum power is obtained according to the mapping. The limitation determiner determines power limitation for the resource pools based on the mapping. In another embodiment, the power limitation is determined based on CBR requirement to make sure power limitation for each carrier satisfies the requirement of the carrier.

Figure 8:
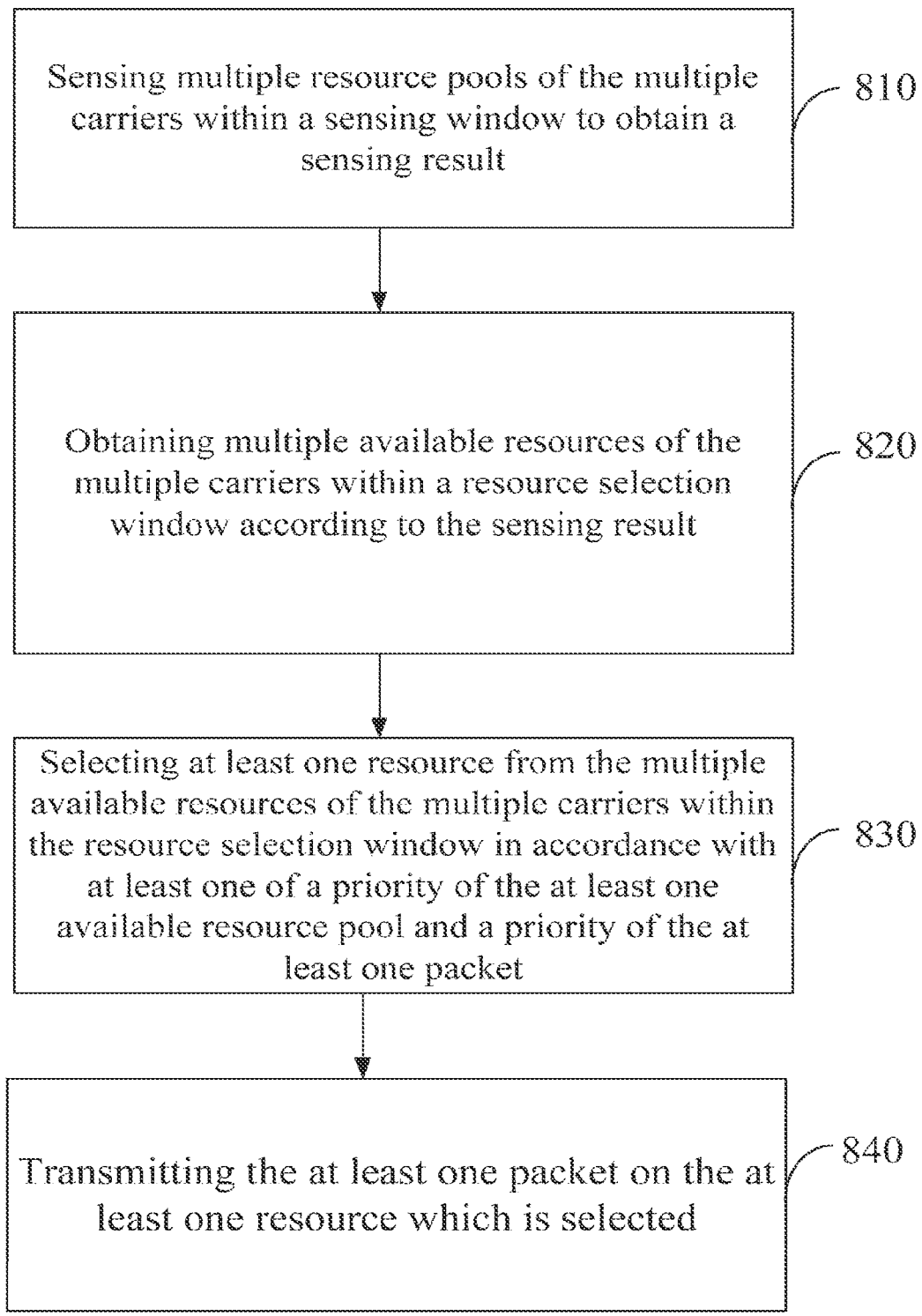
FIG. 8 schematically shows a flowchart of a method for selecting at least one resource across a plurality of carries for transmitting at least one packet in sidelink by a user equipment according to an embodiment of the present disclosure.

FIG. 8 schematically shows a flowchart of a method for selecting at least one resource across a plurality of carries for transmitting at least one packet in sidelink by a user equipment according to an embodiment of the present disclosure. Although specific steps are disclosed in FIG. 8, such steps are examples. That is, the present disclosure is well suited to performing various other steps or variations of the steps recited in FIG. 8.

As shown in FIG. 8, the method includes: step S810, sensing a plurality of resource pools of the plurality of carriers within a sensing window to obtain a sensing result, wherein the length of the sensing window is configurable or preconfigured; step S820, obtaining a plurality of available resources of the plurality of carriers within a resource selection window according to the sensing result, wherein the plurality of available resources are included in at least one resource pool of the plurality of carriers within the resource selection window, wherein the length of the resource selection window is determined according to a desired latency; step S830, selecting at least one resource from the plurality of available resources of the plurality of carriers within the resource selection window in accordance with at least one of a priority of the at least one available resource pool and a priority of the at least one packet; and step S840, transmitting the at least one packet on the at least one resource.

In one embodiment, the step S820 may include: determining a non-monitored resource within the sensing window based on user equipment's capability on whether the user equipment can receive and transmit in sidelink simultaneously. When the user equipment is not able to receive and transmit simultaneously, the step of determining a non-monitored resource within the sensing window based on user equipment's capability on whether the user equipment can receive and transmit in sidelink simultaneously includes: determining a first resource in a subframe in a first carrier within the sensing window as the non-available resource if a second resource in a second carrier within the sensing window in the same subframe is used for transmission.

In one embodiment, the step S830 includes: selecting a resource pool in accordance with a relationship between the priority of the at least one resource pool and the priority of the at least one packet, wherein a resource pool whose priority is not higher than the priority of the at least one packet is selected as at least one selected resource pool, and selecting the at least one resource from the at least one selected resource pool to transmit the at least one packet, wherein the priority of the at least one packet is indicated by a priority of a logical channel of the at least one packet or a priority of a higher layer of the at least one packet.

In one embodiment, the step S830 includes: selecting the at least one resource from the at least one selected resource pool based on a time sequence of the available resources in the at least one resource pool if the at least one resource pool has the same priority.

In one embodiment, the step S830 includes: selecting the at least one resource from the at least one resource pool based on at least one of channel busy ration (CBR) and channel occupancy (CR) of the at least one resource pool if the at least one resource pool has the same priority.

In one embodiment, the method further includes: determining a reception or transmission for the user equipment if the user equipment is not able to receive and transmit simultaneously.

In one embodiment, the step of determining reception or transmission for the user equipment if the user equipment is not able to receive and transmit simultaneously, includes: determining that the transmission has higher priority than that of reception if the user equipment is not able to receive and transmit simultaneously.

In one embodiment, the step of determining reception or transmission for the user equipment if the user equipment is not able to receive and transmit simultaneously, includes: determining the reception or transmission in accordance with a priority of the at least one resource pool, or in accordance with the priority of the at least one resource pool in combination with the priority of the at least one packet.

In one embodiment, the method further includes: allocating power to the at least one resource pool in accordance with at least one of a priority of the at least one resource pool and the priority of the at least one packet.

In one embodiment, the method further includes: determining power limitation for the at least one resource pool based on CBR and a priority of the at least one resource pool.

The above description is on illustrative embodiments of the present disclosure, but not for limitation.

In addition, embodiment of the present disclosure can at least provide the following subject matter.

(1). A user equipment (UE) that selects at least one resource across a plurality of carries for transmitting at least one packet in sidelink, comprising:
a sensor, operative to sense a plurality of resource pools of the plurality of carriers within a sensing window to obtain a sensing result, wherein the length of the sensing window is configurable or preconfigured;
a resource selector, operative to obtain a plurality of available resources of the plurality of carriers within a resource selection window according to the sensing result, wherein the plurality of available resources are included in at least one resource pool of the plurality of carriers within the resource selection window, the resource selector is operative to select at least one resource from the plurality of available resources of the plurality of carriers within the resource selection window in accordance with at least one of a priority of the at least one resource pool and a priority of the at least one packet, and wherein the length of the resource selection window is determined according to a desired latency; and
a transmitter, operative to transmit the at least one packet on the at least one resource which is selected by the resource selector.

(2). The user equipment according to (1), wherein the resource selector is operative to determine a non-monitored resource within the sensing window based on user equipment's capability on whether the user equipment can receive and transmit in sidelink simultaneously, and when the user equipment is not able to receive and transmit simultaneously, a first resource in a subframe in a first carrier within the sensing window is determined as the non-monitored resource if a second resource in a second carrier within the sensing window in the same subframe is used for transmission.

(3). The user equipment according to (1), wherein the resource selector is operative to select a resource pool in accordance with a relationship between the priority of the at least one resource pool and the priority of the at least one packet, wherein the resource selector selects a resource pool whose priority is not higher than the priority of the at least one packet as at least one selected resource pool, and select the at least one resource from the at least one selected resource pool to transmit the at least one packet, wherein the priority of the at least one packet is indicated by a priority of a logical channel of the at least one packet or a priority of a higher layer of the at least one packet.

(4). The user equipment according to (1), wherein the resource selector is operative to select the at least one resource from the at least one resource pool based on a time sequence of the available resources in the at least one resource pool if the at least one resource pool has the same priority.

(5). The user equipment according to (1), wherein the resource selector is operative to select the at least one resource from the at least one resource pool based on at least one of channel busy ration (CBR) and channel occupancy radio (CR) of the at least one resource pool if the at least one resource pool has the same priority.

(6). The user equipment according to (1), further comprising:

a reception/transmission determiner, operative to determine reception or transmission for the user equipment if the user equipment is not able to receive and transmit simultaneously.

(7). The user equipment according to (6), wherein the reception/transmission determiner is configured to determine that the transmission has a higher priority than that of reception if the user equipment is not able to receive and transmit simultaneously.

(8). The user equipment according to (6), wherein the reception/transmission priority determiner is operative to determine reception or transmission in accordance with a priority of the at least one resource pool, or in accordance with the priority of the at least one resource pool in combination with the priority of the at least one packet.

(9). The user equipment according to (1), further comprising:

a power allocator, operative to allocate power to the at least one resource pool in accordance with at least one of a priority of the at least one resource pool and the priority of the at least one packet.

(10). The user equipment according to (1), further comprising:

a power limitation determiner, operative to determine power limitation for the at least one resource pool based on CBR and a priority of the at least one resource pool.

(11). The user equipment according to (1), wherein the user equipment operates in user equipment autonomous scheduling scheme.

(12). A method for selecting at least one resource across a plurality of carries for transmitting at least one packet in sidelink by a user equipment (UE), comprising:

sensing a plurality of resource pools of the plurality of carriers within a sensing window to obtain a sensing result, wherein the length of the sensing window is configurable or preconfigured;

obtaining a plurality of available resources of the plurality of carriers within a resource selection window according to the sensing result, wherein the plurality of available resources are included in at least one resource pool of the plurality of carriers within the resource selection window, wherein the length of the resource selection window is determined according to a desired latency;

selecting at least one resource from the plurality of available resources of the plurality of carriers within the resource selection window in accordance with at least one of a priority of the at least one available resource pool and a priority of the at least one packet; and transmitting the at least one packet on the at least one resource which is selected.

(13). The method according to (12), wherein the step of obtaining a plurality of available resources of the plurality of carriers within a resource selection window according to the sensing result comprises determine a non-monitored resource within the sensing window based on user equipment's capability on whether the user equipment can receive and transmit in sidelink simultaneously, when the user equipment is not able to receive and transmit simultaneously, the step of determine a non-monitored resource within the sensing window based on user equipment's capability on whether the user equipment can receive and transmit in sidelink simultaneously comprises:

determining a first resource in a subframe in a first carrier within the sensing window as the non-available resource if a second resource in a second carrier within the sensing window in the same subframe is used for transmission.

(14). The method according to (12), wherein the step of selecting the at least one resource from the plurality of available resources of the plurality of carriers within the resource selection window in accordance with at least one of a priority of the at least one available resource pool and a priority of the at least one packet comprises:

selecting a resource pool in accordance with a relationship between the priority of the at least one resource pool and the priority of the at least one packet, wherein a resource pool whose priority is not higher than the priority of the at least one packet is selected as at least one selected resource pool; and selecting the at least one resource from the at least one selected resource pool to transmit the at least one packet, wherein the priority of the at least one packet is indicated by a priority of a logical channel of the at least one packet or a priority of a higher layer of the at least one packet.

(15). The method according to (12), wherein the step of selecting the at least one resource from the plurality of available resources of the plurality of carriers within the resource selection window in accordance with at least one of a priority of the at least one available resource pool and a priority of the at least one packet comprising:

selecting the at least one resource from the at least one selected resource pool based on a time sequence of the available resources in the at least one resource pool if the at least one resource pool has the same priority.

(16). The method according to (12), wherein the step of selecting the at least one resource from the plurality of available resources of the plurality of carriers within the resource selection window in accordance with at least one of a priority of the at least one available resource pool and a priority of the at least one packet comprising:

selecting the at least one resource from the at least one resource pool based on at least one of channel busy ration (CBR) and channel occupancy (CR) of the at least one resource pool if the at least one resource pool has the same priority.

(17). The method according to (12), further comprising:
determining reception or transmission for the user equipment if the user equipment is not able to receive and transmit simultaneously.

(18). The method according to (17), the step of determining reception or transmission priority for the user equipment if the user equipment is not able to receive and transmit simultaneously, comprising:
determining that the transmission has a higher priority than that of reception if the user equipment is not able to receive and transmit simultaneously.

(19). The method according to (17), wherein the step of determining reception or transmission for the user equipment if the user equipment is not able to receive and transmit simultaneously, comprising:
determining the reception and transmission in accordance with a priority of the at least one resource pool, or in accordance with the priority of the at least one resource pool in combination with the priority of the at least one packet.

(20). The method according to (12), further comprising:
allocating power to the at least one resource pool in accordance with at least one of a priority of the at least one resource pool and the priority of the at least one packet.

(21). The method according to (12), further comprising:
determining power limitation for the at least one resource pool based on CBR and a priority of the at least one resource pool.

(22). The method according to (12), wherein the user equipment operates in user equipment autonomous scheduling scheme.

(23). A user equipment (UE) that selects at least one resource across a plurality of carries for transmitting at least one packet in sidelink, comprising:
a sensor, operative to sense a plurality of resource pools of the plurality of carriers within a sensing window to obtain a sensing result, wherein the length of the sensing window is configurable or preconfigured;
a resource selector, operative to select at least one resource from the plurality of available resources of the plurality of carriers within the resource selection window based on the sensing result, and the resource selector is operative to determine a non-monitored resource within the sensing window based on user equipment's capability on whether the user equipment can receive and transmit in sidelink simultaneously, and when the user equipment is not able to receive and transmit simultaneously, a first resource in a subframe in a first carrier within the sensing window is determined as the non-monitored resource if a second resource in a second carrier within the sensing window in the same subframe is used for transmission, wherein the length of the resource selection window is determined according to a desired latency, and the resource selector is operative to select at least one resource from the plurality of available resources of the plurality of carriers within the resource selection window; and
a transmitter, operative to transmit the at least one packet on the at least one resource which is selected by the resource selector.

(24). The user equipment according to (23), wherein the resource selector is operative to select a resource pool in accordance with a relationship between the priority of the at least one resource pool and the priority of the at least one packet, wherein the resource selector selects a resource pool whose priority is not higher than the priority of the at least one packet as at least one selected resource pool, and select the at least one resource from the at least one selected resource pool to transmit the at least one packet, wherein the priority of the at least one packet is indicated by a priority of a logical channel of the at least one packet or a priority of a higher layer of the at least one packet.

(25). The user equipment according to (23), wherein the resource selector is operative to select the at least one resource from the at least one resource pool based on a time sequence of the available resources in the at least one resource pool if the at least one resource pool has the same priority.

(26). The user equipment according to (23), wherein the resource selector is operative to select the at least one resource from the at least one resource pool based on at least one of channel busy ration (CBR) and channel occupancy radio (CR) of the at least one resource pool if the at least one resource pool has the same priority.

(27). The user equipment according to (23), further comprising:
a reception/transmission determiner, operative to determine reception or transmission for the user equipment if the user equipment is not able to receive and transmit simultaneously.

(28). The user equipment according to (27), wherein the reception/transmission determiner is operative to determine that the transmission has a higher priority than that of reception if the user equipment is not able to receive and transmit simultaneously.

(29). The user equipment according to (27), wherein the reception/transmission determiner is operative to determine reception or transmission in accordance with a priority of the at least one resource pool, or in accordance with the priority of the at least one resource pool in combination with the priority of the at least one packet.

(30). The user equipment according to (23), further comprising:
a power allocator, operative to allocate power to the at least one resource pool in accordance with at least one of a priority of the at least one resource pool and the priority of the at least one packet.

(31). The user equipment according to (23), further comprising:
a power limitation determiner, operative to determine power limitation for the at least one resource pool based on CBR and a priority of the at least one resource pool.

(32). The user equipment according to (23), wherein the user equipment operates in UE autonomous scheduling scheme.

(33). A method for selecting at least one resource across a plurality of carries for transmitting at least one packet in sidelink by a user equipment (UE), comprising:
sensing a plurality of resource pools of the plurality of carriers within a sensing window to obtain a sensing result, wherein the length of the sensing window is configurable or preconfigured;

obtaining a plurality of available resources of the plurality of carriers within a resource selection window according to the sensing result, wherein the length of the resource selection window is determined according to a desired latency, and determining a non-monitored resource within the sensing window based on user equipment's capability on whether the user equipment can receive and transmit in sidelink simultaneously, when the user equipment is not able to receive and transmit simultaneously, the step of determine a non-monitored resource within the sensing window based on user equipment's capability on whether the user equipment can receive and transmit in sidelink simultaneously comprises:

determining a first resource in a subframe in a first carrier within the sensing window as the non-monitored resource if a second resource in a second carrier within the sensing window in the same subframe is used for transmission;

selecting at least one resource from the plurality of available resources of the plurality of carriers within the resource selection window; and transmitting the at least one packet on the at least one resource.

(34). The method according to (33), wherein the step of selecting the at least one resource from the plurality of available resources of the plurality of carriers within the resource selection window, comprising:

selecting a resource pool in accordance with a relationship between the priority of the at least one resource pool and the priority of the at least one packet, wherein a resource pool whose priority is not higher than the priority of the at least one packet is selected as at least one selected resource pool; and selecting the at least one resource from the at least one selected resource pool to transmit the at least one packet, wherein the priority of the at least one packet is indicated by a priority of a logical channel of the at least one packet or a priority of a higher layer of the at least one packet.

(35). The method according to (33), wherein the step of selecting the at least one resource from the plurality of available resources of the plurality of carriers within the resource selection window, comprising:

selecting the at least one resource from the at least one selected resource pool based on a time sequence of the available resources in the at least one resource pool if the at least one resource pool has the same priority.

(36). The method according to (33), wherein the step of selecting the at least one resource from the plurality of available resources of the plurality of carriers within the resource selection window, comprising:

selecting the at least one resource from the at least one resource pool based on at least one of channel busy ration (CBR) and channel occupancy (CR) of the at least one resource pool if the at least one resource pool has the same priority.

(37). The method according to (33), further comprising:

determining reception or transmission for the user equipment if the user equipment is not able to receive and transmit simultaneously.

(38). The method according to (37), the step of determining reception or transmission for the user equipment if the user equipment is not able to receive and transmit simultaneously, comprising:

determining that the transmission has a higher priority than that of reception if the user equipment is not able to receive and transmit simultaneously.

(39). The method according to (37), the step of determining reception or transmission for the user equipment if the user equipment is not able to receive and transmit simultaneously, comprising:

determining reception or transmission in accordance with a priority of the at least one resource pool, or in accordance with the priority of the at least one resource pool in combination with the priority of the at least one packet.

(40). The method according to (33), further comprising:

allocating power to the at least one resource pool in accordance with at least one of a priority of the at least one resource pool and the priority of the at least one packet.

(41). The method according to (33), further comprising:

determining power limitation for the at least one resource pool based on CBR and a priority of the at least one resource pool.

(42). The method according to (33), wherein the user equipment operates in UE autonomous scheduling scheme.

(43). A user equipment (UE) that selects at least one resource across a plurality of carries for transmitting at least one packet in sidelink, comprising:

a sensor, operative to sense a plurality of resource pools of the plurality of carriers within a sensing window to obtain a sensing result, wherein the length of the sensing window is configurable or preconfigured;

a resource selector, operative to obtain a plurality of available resources of the plurality of carriers within a resource selection window according to the sensing result wherein the length of the resource selection window is determined according to a desired latency a reception/transmission determiner, operative to determine reception or transmission for the user equipment if the user equipment is not able to receive and transmit simultaneously; and a transmitter, operative to transmit the at least one packet on the at least one resource which is selected by the resource selector.

(44). The user equipment according to (43), resource selector is operative to determine a non-monitored resource within the sensing window based on user equipment's capability on whether the user equipment can receive and transmit in sidelink simultaneously, and when the user equipment is not able to receive and transmit simultaneously, a first resource in a subframe in a first carrier within the sensing window is determined as the non-monitored resource if a second resource in a second carrier within the sensing window in the same subframe is used for transmission.

(45). The user equipment according to (43), wherein the resource selector is operative to select a resource pool in accordance with a relationship between the priority of the at least one resource pool and the priority of the at least one packet, wherein the resource selector selects a resource pool whose priority is not higher than the priority of the at least one packet as at least one selected resource pool, and select the at least one resource from the at least one selected resource pool to transmit the at least one packet, wherein the priority of the at least one packet is indicated by a priority of a logical channel of the at least one packet or a priority of a higher layer of the at least one packet.

(46). The user equipment according to (43), wherein the resource selector is operative to select the at least one resource from the at least one resource pool based on a time sequence of the available resources in the at least one resource pool if the at least one resource pool has the same priority.

(47). The user equipment according to (43), wherein the resource selector is operative to select the at least one resource from the at least one resource pool based on at least one of channel busy ration (CBR) and channel occupancy radio (CR) of the at least one resource pool if the at least one resource pool has the same priority.

(48). The user equipment according to (43), wherein the reception/transmission determiner is configured to determine that the transmission has a higher priority than that of reception if the user equipment is not able to receive and transmit simultaneously.

(49). The user equipment according to (43), wherein the reception/transmission determiner is operative to determine reception or transmission in accordance with a priority of the at least one resource pool, or in accordance with the priority of the at least one resource pool in combination with the priority of the at least one packet.

(50). The user equipment according to (43), further comprising:
a power allocator, operative to allocate power to the at least one resource pool in accordance with at least one of a priority of the at least one resource pool and the priority of the at least one packet.

(51). The user equipment according to (43), further comprising:
a power limitation determiner, operative to determine power limitation for the at least one resource pool based on CBR and a priority of the at least one resource pool.

(52). The user equipment according to (43), wherein the user equipment operates in UE autonomous scheduling scheme.

(53). A method for selecting at least one resource across a plurality of carries for transmitting at least one packet in sidelink by a user equipment (UE), comprising:
sensing a plurality of resource pools of the plurality of carriers within a sensing window to obtain a sensing result, wherein the length of the sensing window is configurable or preconfigured;
obtaining a plurality of available resources of the plurality of carriers within a resource selection window according to the sensing result, wherein the plurality of available resources are included in at least one resource pool of the plurality of carriers within the resource selection window, wherein the length of the resource selection window is determined according to a desired latency;
selecting the at least one resource from the plurality of available resources of the plurality of carriers within the resource selection window;
determining reception or transmission for the user equipment if the user equipment is not able to receive and transmit simultaneously; and
transmitting the at least one packet on the at least one resource.

(54). The method according to (53), wherein the step of obtaining a plurality of available resources of the plurality of carriers within a resource selection window according to the sensing result comprises determining a non-monitored resource within the sensing window based on user equipment's capability on whether the user equipment can receive and transmit in sidelink simultaneously,
when the user equipment is not able to receive and transmit simultaneously, the step of determining a non-monitored resource within the sensing window based on user equipment's capability on whether the user equipment can receive and transmit in sidelink simultaneously comprises:
determining a first resource in a subframe in a first carrier within the sensing window as the non-monitored resource if a second resource in a second carrier within the sensing window in the same subframe is used for transmission.

(55). The method according to (53), wherein the step of selecting the at least one resource from the plurality of available resources of the plurality of carriers within the resource selection window comprises:
selecting a resource pool in accordance with a relationship between the priority of the at least one resource pool and the priority of the at least one packet, wherein a resource pool whose priority is not higher than the priority of the at least one packet is selected as at least one selected resource pool; and
selecting the at least one resource from the at least one selected resource pool to transmit the at least one packet,
wherein the priority of the at least one packet is indicated by a priority of a logical channel of the at least one packet or a priority of a higher layer of the at least one packet.

(56). The method according to (53), wherein the step of selecting the at least one resource from the plurality of available resources of the plurality of carriers within the resource selection window comprising:
selecting the at least one resource from the at least one selected resource pool based on a time sequence of the available resources in the at least one resource pool if the at least one resource pool has the same priority.

(57). The method according to (53), wherein the step of selecting the at least one resource from the plurality of available resources of the plurality of carriers within the resource selection window comprising:
selecting the at least one resource from the at least one resource pool based on at least one of channel busy ration (CBR) and channel occupancy (CR) of the at least one resource pool if the at least one resource pool has the same priority.

(58). The method according to (53), the step of determining reception or transmission for the user equipment if the user equipment is not able to receive and transmit simultaneously, comprising:
determining that the transmission has a higher priority than that of reception if the user equipment is not able to receive and transmit simultaneously.

(59). The method according to (53), wherein the step of determining reception or transmission for the user equipment if the user equipment is not able to receive and transmit simultaneously, comprising:
determining reception or transmission in accordance with a priority of the at least one resource pool, or in accordance with the priority of the at least one resource pool in combination with the priority of the at least one packet.

(60). The method according to (53), further comprising: allocating power to the at least one resource pool in accordance with at least one of a priority of the at least one resource pool and the priority of the at least one packet.

(61). The method according to (53), further comprising: determining power limitation for the at least one resource pool based on CBR and a priority of the at least one resource pool.

(62). The method according to (53), wherein the user equipment operates in UE autonomous scheduling scheme.

The present disclosure can be realized by software, hardware, or software in cooperation with hardware. Each functional block used in the description of each embodiment described above can be partly or entirely realized by an LSI such as an integrated circuit, and each process described in the each embodiment may be controlled partly or entirely by the same LSI or a combination of LSIs. The LSI may be individually formed as chips, or one chip may be formed so as to include a part or all of the functional blocks. The LSI may include a data input and output coupled thereto. The LSI here may be referred to as an IC, a system LSI, a super LSI, or an ultra LSI depending on a difference in the degree of integration. However, the technique of implementing an integrated circuit is not limited to the LSI and may be realized by using a dedicated circuit, a general-purpose processor, or a special-purpose processor. In addition, a FPGA (Field Programmable Gate Array) that can be programmed after the manufacture of the LSI or a reconfigurable processor in which the connections and the settings of circuit cells disposed inside the LSI can be reconfigured may be used. The present disclosure can be realized as digital processing or analogue processing. If future integrated circuit technology replaces LSIs as a result of the advancement of semiconductor technology or other derivative technology, the functional blocks could be integrated using the future integrated circuit technology. Biotechnology can also be applied.

Examples of several embodiments of the present disclosure have been described in detail above, with reference to the attached illustrations of specific embodiments. Because it is not possible, of course, to describe every conceivable combination of components or techniques, those skilled in the art will appreciate that various modifications may be made to the above described embodiments without departing from the scope of the present disclosure. For example, it will be readily appreciated that although the above embodiments are described with reference to parts of a The 3rd Generation Partnership Project (3GPP) network, an embodiment of the present disclosure will also be applicable to like networks, such as a successor of the 3GPP network, having like functional components.

Therefore, in particular, the terms 3GPP and associated or related terms used in the above description and in the enclosed drawings and any appended claims now or in the future are to be interpreted accordingly.

The present disclosure can be realized by software, hardware, or software in cooperation with hardware. Each functional block used in the description of each embodiment described above can be realized by an LSI as an integrated circuit, and each process described in the each embodiment may be controlled by LSI. They may be individually formed as chips, or one chip may be formed so as to include a part or all of the functional blocks. They may include a data input and output coupled thereto. The LSI here may be referred to as an IC, a system LSI, a super LSI, or an ultra LSI depending on a difference in the degree of integration. However, the technique of implementing an integrated circuit is not limited to the LSI and may be realized by using a dedicated circuit or a general-purpose processor. In addition, a FPGA (Field Programmable Gate Array) that can be programmed after the manufacture of the LSI or a reconfigurable processor in which the connections and the settings of circuits cells disposed inside the LSI can be reconfigured may be used.

Notably, modifications and other embodiments of the disclosed disclosure(s) will come to mind to one skilled in the art having the benefit of the teachings presented in the foregoing descriptions and the associated drawings. Therefore, it is to be understood that the disclosure(s) is/are not to be limited to the specific embodiments disclosed and that modifications and other embodiments are intended to be included within the scope of this disclosure. Although specific terms may be employed herein, they are used in a generic and descriptive sense only and not for purposes of limitation.

The invention claimed is:

1. A communication apparatus, comprising:
circuitry; and
an antenna, which is coupled to the circuitry, wherein
when a relation between a first resource pool in a first carrier and a priority of a packet does not satisfy a predetermined condition,
the circuitry, in operation, selects a second resource pool out of a plurality of resource pools in a plurality of carriers, based on channel busy ratios (CBRs) of the plurality of resource pools, wherein the second resource pool is selected in increasing order of the CBRs from a lowest CBR of the CBRs of the plurality of resource pools, and
the circuitry, in operation, determines power limitation for the selected second resource pool based on the CBRs, and
the antenna, in operation, transmits the packet using the second resource pool based on the determined power limitation.

2. The communication apparatus according to claim 1, wherein the circuitry selects the second resource pool based on channel occupancy ratios (CRs) of the plurality of resource pools.

3. The communication apparatus according to claim 2, wherein the second resource pool is selected in increasing order of the CRs from a lowest CR of the CRs.

4. The communication apparatus according to claim 1, wherein at least one resource in the second resource pool is selected, out of a plurality of resources in the second resource pool, based on Received Signal Strength Indicators (RSSIs) of the plurality of resources.

5. The communication apparatus according to claim 1, wherein any resources which the communication apparatus does not monitor are precluded from selection of at least one resource in the second resource pool.

* * * * *